United States Patent
Bae et al.

(10) Patent No.: US 9,323,066 B2
(45) Date of Patent: Apr. 26, 2016

(54) THREE DIMENSIONAL IMAGE DISPLAY APPARATUS

(75) Inventors: Jung-mok Bae, Seoul (KR); Yoon-sun Choi, Yongin-si (KR); Mi-jeong Song, Suwon-si (KR); Hoon Song, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1012 days.

(21) Appl. No.: 13/418,380

(22) Filed: Mar. 13, 2012

(65) Prior Publication Data

US 2012/0249537 A1  Oct. 4, 2012

(30) Foreign Application Priority Data

Mar. 31, 2011  (KR) ................. 10-2011-0029849

(51) Int. Cl.
*H04N 13/04*  (2006.01)
*G02B 27/22*  (2006.01)

(52) U.S. Cl.
CPC ........ *G02B 27/2214* (2013.01); *H04N 13/0404* (2013.01); *H04N 13/0409* (2013.01); *H04N 13/0452* (2013.01); *H04N 13/0497* (2013.01)

(58) Field of Classification Search
CPC .......... H04N 13/0497; H04N 13/0404; H04N 13/0409
See application file for complete search history.

(56) References Cited

U.S. PATENT DOCUMENTS

| | | | |
|---|---|---|---|
| 2006/0158511 A1* | 7/2006 | Harrold et al. | 348/51 |
| 2008/0117231 A1* | 5/2008 | Kimpe | 345/629 |
| 2008/0278809 A1* | 11/2008 | Redert et al. | 359/478 |
| 2010/0195190 A1* | 8/2010 | Ishioka et al. | 359/316 |
| 2010/0208194 A1* | 8/2010 | Gupta et al. | 351/159 |

FOREIGN PATENT DOCUMENTS

| | | |
|---|---|---|
| JP | 2009-157302 | 7/2009 |
| KR | 10-2006-0006121 | 1/2006 |
| KR | 10-2009-0047933 | 5/2009 |
| WO | WO 2007/099488 A1 | 9/2007 |

* cited by examiner

*Primary Examiner* — Chikaodili E Anyikire
(74) *Attorney, Agent, or Firm* — NSIP Law (57) ABSTRACT

A method and apparatus for displaying three dimensional (3D) images are provided. The display apparatus includes a backlight unit which emits light, an image panel which includes plurality of pixels for modulating the light from the backlight unit to form a gray scaled image, an electrowetting lens unit which includes first electrowetting lenses arranged to correspond to the plurality of pixels in the image panel and second electrowetting lenses arranged opposite to the first electrowetting lenses, wherein at least two of the first electrowetting lenses and at least one of the second electrowetting lenses may be arranged opposite each other; and a controller which controls the electrowetting lens unit to separate beams exiting from the image panel into at least two viewing zones in a 3D image display mode.

30 Claims, 9 Drawing Sheets

THREE DIMENSIONAL IMAGE DISPLAY APPARATUS

CROSS-REFERENCE TO RELATED APPLICATIONS

This application claims the benefit under 35 U.S.C. §119(a) of Korean Patent Application No. 10-2011-0029849, filed on Mar. 31, 2011, in the Korean Intellectual Property Office, the entire disclosure of which is incorporated herein by reference for all purposes.

BACKGROUND

1. Field

The following description relates to three dimensional (3D) image display apparatuses, and, more particularly, to glasses-less 3D image display apparatuses.

2. Description of the Related Art

As the flat panel display market has become more and more saturated, the flat panel display industry has been trying to find new ways of improving the flat panel display products in order to differentiate these various products from one another. Three dimensional (3D) image display apparatuses have attracted significant attention as the mainstream application devices of the next generation flat panel display industry. Currently, most movie theaters and recently commercialized television products based on flat panel displays adopt a method involving the use of specially constructed glasses in order for the user to experience the display of a 3D image. However, because users would generally prefer to not have to wear such glasses for televisions and mobile displays, technologies for glasses-less methods are being researched and developed in consideration of user convenience.

Even for a glasses-less autostereoscopic method, switching between two dimensional (2D) images and 3D images is required for compatibility with existing display panels and content, so a switching device is provided on display panels to compensate for the lack of glasses.

SUMMARY

Provided are various embodiments of glasses-less three dimensional (3D) image display apparatuses adopting a new way of separating viewing zones.

In one general aspect, there is provided a 3D image display apparatus including a backlight unit which emits light, an image panel which includes a plurality of pixels for modulating the light from the backlight unit according to image information to form a gray scaled image, an electrowetting lens unit which includes a plurality of first electrowetting lenses arranged to correspond to the plurality of pixels in the image panel and a plurality of second electrowetting lenses arranged opposite to the first electrowetting lenses, wherein at least two of the first electrowetting lenses face each one of the second electrowetting lenses, and a controller which controls the electrowetting lens unit to separate beams exiting from the image panel into at least two viewing zones in a 3D image display mode.

The controller may control the electrowetting lens unit in the 3D image display mode such that focal points of the plurality of the first electrowetting lenses on light exiting sides and of the plurality of the second electrowetting lenses on light incident sides share a same focal plane.

The at least two of the first electrowetting lenses may be a pair of the first electrowetting lenses arranged adjacent to each other in a horizontal direction.

The controller may control the electrowetting lens unit in the 3D image display mode such that beams that have passed through one electrowetting lens of each pair of the first electrowetting lenses may be directed to a first viewing zone, while beams that have passed through another electrowetting lens of each pair of the first electrowetting lenses may be directed to a second viewing zone that is different from the first viewing zone, wherein the image panel may render images for a single viewpoint that correspond to the first viewing zone with pixels that each correspond to the one electrowetting lens of each pair of the first electrowetting lenses, and render images for a single viewpoint that correspond to the second viewing zone with pixels that each correspond to the other first electrowetting lens of each pair of the first electrowetting lenses.

The controller may control the electrowetting lens unit in the 3D image display mode such that beams that have passed through one electrowetting lens of each pair of the first electrowetting lenses are time-sequentially directed to a plurality of the first viewing zone, while beams that have passed through another electrowetting lens of each pair of the first electrowetting lenses are time-sequentially directed to a plurality of the second viewing zone. The plurality of the first viewing zone and the plurality of the second viewing zone are different from each other, and the image panel may time-sequentially render multi-view images with two images at a time. The first and second viewing zones may be apart from each other by a distance less or equal to a distance between both eyes of a user (for example, about 6.5 cm). Super multi-views may be realized where the distance in between the first and second viewing zones is narrower than the diameter of the viewer's pupil.

The controller may control the electrowetting lens unit in a two dimensional (2D) image display mode such that beams may be exiting from the image panel without separation of viewing zones. In this case, the controller may control the electrowetting lens unit in the 2D image display mode, such that the plurality of the first electrowetting lenses and the plurality of the second electrowetting lenses may have substantially infinite foci. The controller may control the electrowetting lens unit in the 3D image display mode or the 2D image display mode selectively.

The plurality of first electrowetting lenses may include a first plate, first sidewalls in a square lattice form provided on the first plate, first mediums provided in spaces between the first sidewalls, and a first electrode structure provided on the first sidewalls. The plurality of second electrowetting lenses may include a second plate arranged apart from the first plate, second sidewalls in a square lattice form provided on the second plate, second mediums provided in spaces between the second sidewalls, and a second electrode structure provided on the second sidewalls. A transparent base medium not mixable with the first and/or second mediums may be filled in a space between the first and second electrowetting lenses.

The first electrode structure may include first electrodes arranged on both opposite sides of the first sidewalls in a horizontal direction of the first sidewalls, and the second electrode structure may include second electrodes arranged on both opposite sides of the second sidewalls in a horizontal direction of the second sidewalls.

A first common voltage may be applied to the first electrodes, and a second common voltage may be applied to the second electrodes.

The first medium may be an oil based solution including color dyes, or a water solution including color pigments.

The plurality of first electrowetting lenses may include red, green, and blue electrowetting lenses, and the image panel may include no color filter.

The plurality of first electrowetting lenses may be transparent electrowetting lenses, and the image panel may further include a color filter.

The backlight unit may be a light source emitting collimated light.

The sidewalls may be made from black materials that block light transmission.

The image panel may be a liquid crystal panel.

The 3D image display apparatus may further include a sensor to detect a viewer's position, wherein the controller may control separation of viewing zones of the electrowetting lens unit based regarding information on the viewer's position detected from the sensor in the 3D image display mode.

The 3D image display apparatus may further include a variable diffuser unit capable of switching between a scattering state to scatter beams through the variable diffuser unit and a transparency state to transmit beams through the variable diffuser unit without scattering, wherein the controller may control the variable diffuser unit to be in the transparency state in the 3D image display mode and to be in the scattering state in the 2D image display mode.

The variable diffuser unit may be a polymer dispersed liquid crystal panel.

In another general aspect, there is provided a three dimensional (3D) image display apparatus including an electrowetting lens unit including a plurality of first electrowetting lenses arranged to correspond to a plurality of pixels, and a plurality of second electrowetting lenses arranged opposite to the first electrowetting lenses, wherein at least two of the first electrowetting lenses face each one of the second electrowetting lenses, and a controller which controls the electrowetting lens unit to separate beams passing the electrowetting lens unit into at least two viewing zones in a 3D image display mode.

The controller may adjust the curvature of the first and second electrowetting lenses through voltages applied to electrodes provided adjacent to the respective first and second electrowetting lenses.

The controller may control the first and second electrowetting lenses to be substantially flat to display two dimensional images.

The controller may actively adjust the curvature of the first and second electrowetting lenses according to a sensed movement of a viewer.

The controller may sequentially control the electrowetting lens unit to separate beams passing the electrowetting lens unit into at least two viewing zones for each eye of a viewer.

In another general aspect, there is provided a method of displaying three dimensional (3D) images, the method including controlling a plurality of first electrowetting lenses arranged to correspond to a plurality of pixels, and a plurality of second electrowetting lenses arranged opposite to the first electrowetting lenses, wherein at least two of the first electrowetting lenses face each one of the second electrowetting lenses, to separate beams passing the electrowetting lens unit into at least two viewing zones in a 3D image display mode.

The method may further include adjusting the curvature of the first and second electrowetting lenses through voltages applied to electrodes provided adjacent to the respective first and second electrowetting lenses.

The method may further include controlling the first and second electrowetting lenses to be substantially flat to display two dimensional images.

The method may further include controlling the curvature of the first and second electrowetting lenses according to a sensed movement of a viewer.

The method may further include sequentially controlling the electrowetting lens unit to separate beams passing the electrowetting lens unit into at least two viewing zones for each eye of a viewer.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. In this regard, the various embodiments described may have different forms and should not be construed as being limited to the descriptions set forth herein. Accordingly, the embodiments are merely described below, by referring to the figures, to explain aspects of the present description. Element sizes and thicknesses may be exaggerated for clarity. Also, descriptions of well-known functions and constructions may be omitted for increased clarity and conciseness.

Figure 1:
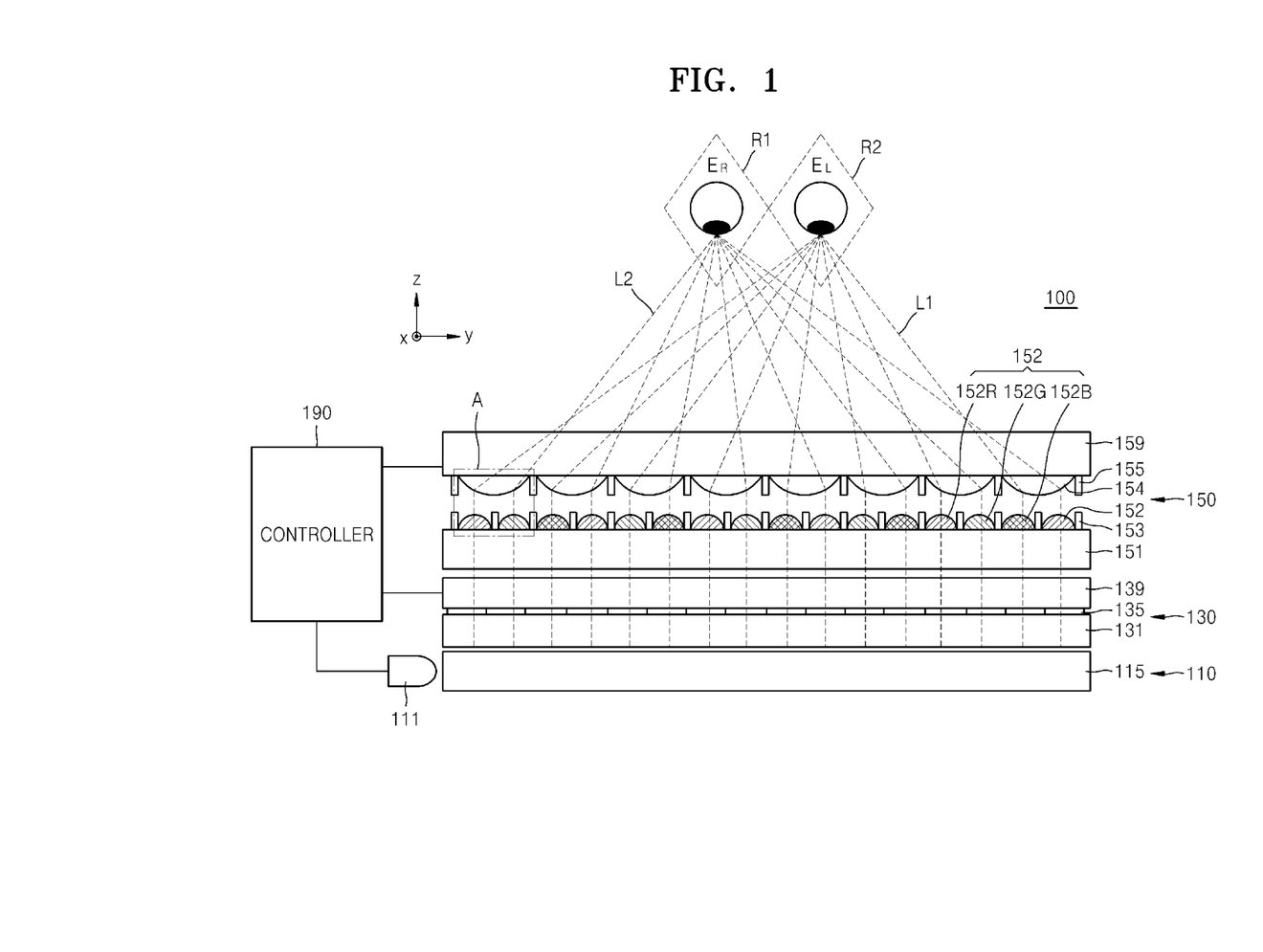
FIG. 1 is a schematic diagram illustrating a three dimensional (3D) image display apparatus according to an embodiment.

FIG. 1 is a schematic diagram illustrating an example embodiment of a three dimensional (3D) image display apparatus 100.

Referring to the example illustrated in FIG. 1, the 3D image display apparatus 100 includes a backlight unit 110, an image panel 130, an electrowetting lens unit 150, and a controller 190.

In this example, the backlight unit 110 is positioned in the rear of the image panel 130, relative to the front which is viewed by a user, and illuminates collimated light on the image panel 130. The backlight unit 110 may employ a commonly known collimated plane light source. For example, the backlight unit 110 may include a light source 111 and a light guide plate 115 that guides light illuminated from the light source 111 so as to be emitted as collimated light flux.

The image panel 130 may be a unit for forming gray-scale images. For example, the image panel 130 may be a liquid crystal panel that includes a first substrate 131, a liquid crystal layer 135, and a second substrate 139. The liquid crystal layer 135 may have a plurality of liquid crystal cells arranged to have a two dimensional (2D) matrix structure, to modulate light L1 and L2 incident from the backlight unit 110 into a gray scaled image based on image information. Transparent pixel electrodes (not shown) and pixel circuits (not shown) used to apply a voltage to the liquid crystal layer 135 may be disposed on an upper surface of the first substrate 131, and transparent common electrodes (not shown) may be disposed on a lower surface of the second substrate 139. The first substrate 131, the liquid crystal layer 135, and the second substrate 139 may together constitute the liquid crystal panel without a color filter. In the displaying of 3D images by the image panel 130, for example, pixels in odd columns may be used for images for a left eye, and pixels in even columns may be used for images for a right eye. In other embodiments, the odd and even columns may be reversed, or different numbers of adjacent columns may be configured for the particular eye, etc.

The electrowetting lens unit 150 is arranged on an exiting side (i.e., the front) of the image panel 130, and performs separation of viewing zones by refracting light L1 and L2 that passes through the image panel 130 into different viewing zones. The electrowetting lens unit 150 includes a plurality of first and second electrowetting lenses 152 and 154 disposed between a first plate 151 and a second plate 159. Each of the first and second electrowetting lenses 152 and 154 may be a varifocal lens using a known electrowetting principle. The first electrowetting lenses 152 may be arranged on the first plate 151, and the second electrowetting lenses 154 may be arranged on the second plate 159.

The first electrowetting lenses 152 may be arranged to correspond to pixels in the image panel 130 on a one to one basis. In other words, the first electrowetting lenses 152 may be arranged in the previously described 2D matrix structure. First sidewalls 153 may be provided on the first plate 151 in a square lattice form to partition pixels, and thus the first electrowetting lenses 152 may be divided by the first sidewalls 153 on pixel-by-pixel basis.

The first sidewalls 153 may be formed from black materials for blocking light transmission. Thus, the first sidewalls 153 may function as a black matrix to prevent beams that have passed through adjacent first electrowetting lenses 152 from overlapping with each other, thus preventing crosstalk. Since beams incident on the electrowetting lens unit 150 are collimated, a conventional problem caused by an increase in width of the black matrix (i.e., a decrease in an aperture ratio) due to diffusion of light does not arise even though the first sidewalls 153 function as a black matrix. In more detail, conventional 3D image display apparatuses using vertical lenticular lens arrays suffer from black stripes appearing at a certain viewing angle because the black matrix provided on the image panel is expanded by the lenticular lens arrays. However, the 3D image display apparatus of the embodiment illustrated in FIG. 1 does not suffer from the appearance of black stripes because the first sidewalls 153 provided in the electrowetting lens unit 150 perform the function of the black matrix.

Figure 2:
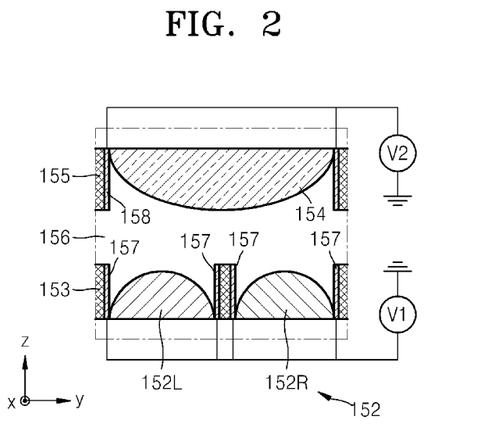
FIG. 2 is a schematic diagram illustrating an electrowetting lens unit enlarged from a region A of FIG. 1.

The second electrowetting lenses 154 may each be arranged to correspond to two of the first electrowetting lenses 152 as viewed from a plane (yz-plane) perpendicular to the vertical direction. In more detail, as illustrated in FIG. 2, a pair of the first electrowetting lenses 152L and 152R and one of the second electrowetting lenses 154 are arranged to face each other. In this example, the pair of the first electrowetting lenses 152L and 152R are an adjacent pair on left and right sides in the horizontal direction. The second sidewalls 155 are provided on the second plate 159 in a square lattice form, which function to separate the second electrowetting lenses 154 from one another.

Furthermore, the first electrowetting lenses 152 may include, for example, red, green, and blue electrowetting lenses 152R, 152G, and 152B to function as a color filter. As an array of the first electrowetting lenses 152 may function as a color filter, no separate color filters are needed to be installed on the image panel 130. As such, the elimination of the color filter from the image panel 130 may lead to an elimination of a process such as alignment of upper and lower plates, which is normally required for manufacturing conventional image panels, thereby improving product yield and saving costs due to the simplified process.

FIG. 2 is a schematic diagram illustrating the electrowetting lens unit 150 enlarged from a region A of FIG. 1. Referring to FIG. 2, a space between the first and second electrowetting lenses 152 and 154 may be filled with a base medium 156. A lens medium forming the first and/or second electrowetting lenses 152,154 and the base medium 156 may be fluids that do not mix with each other and have different refraction indices and different electrical conductivities. For example, the lens medium forming the first and/or second electrowetting lenses 152 and 154 may be an oil based fluid, while the base medium 156 may be a transparent water solution that does not mix with the lens medium. In some cases, the base medium 156 may be a transparent oil based fluid while the lens medium may be a water solution. Furthermore, the first electrowetting lenses 152 may contain color dyes or color pigments to realize red, green and blue colors.

In the example illustrated in FIG. 2, first electrodes 157 are provided on both opposite sides of the first sidewalls 153 in a ±y direction, that is, in a horizontal direction relative to the illustration of FIG. 2. Also, second electrodes 158 are provided on both opposite sides of the second side walls 155 in the ±y direction. Insulating layers (not shown) may be applied to the surfaces of the first and second electrodes 157 and 158, the insulating layers being made from hydrophobic materials or having hydrophobic properties due to hydrophobic films applied thereon. A first common voltage V1 may be applied to the first electrodes 157, while a second common voltage V2 may be applied to the second electrodes 158.

Referring to FIGS. 1, 2, and 3A to 3C, operations of the example 3D image display apparatus 100 with the electrowetting lens unit 150 will be described.

In a case in which the first common voltage V1 is applied to the first electrodes 157, the first electrowetting lenses 152 that are situated between the first electrodes 157 are transformed by electrowetting. By the first common voltage V1 applied, the first electrowetting lenses 152 are transformed to be of semi cylindrical shapes standing in the vertical direction (x direction) since the first electrodes 157 are arranged on both opposite sides of the first sidewalls 153 in the ±y direction as described above. Similarly, by applying the second common voltage V2, the second electrowetting lenses 154 are transformed to have semi cylindrical shapes standing in the vertical direction (x direction) since the second electrodes 158 are arranged on both opposite sides of the second sidewalls 155 in the ±y direction.

Figure 3A:
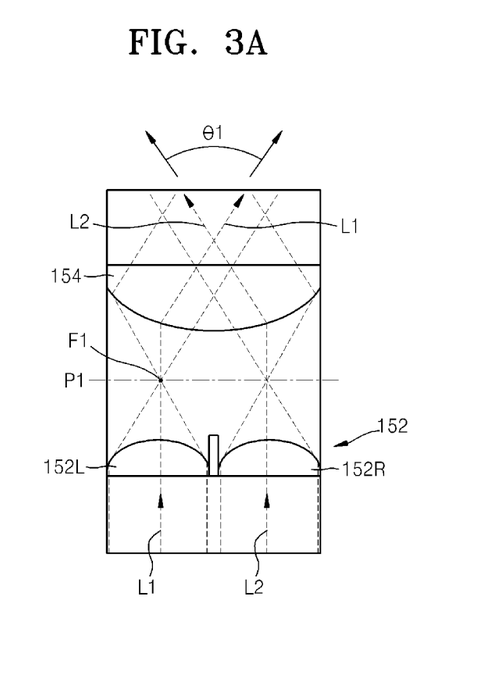
FIGS. 3A through 3C illustrate operations of the 3D electrowetting lens unit of FIG. 2.
Figure 3B:
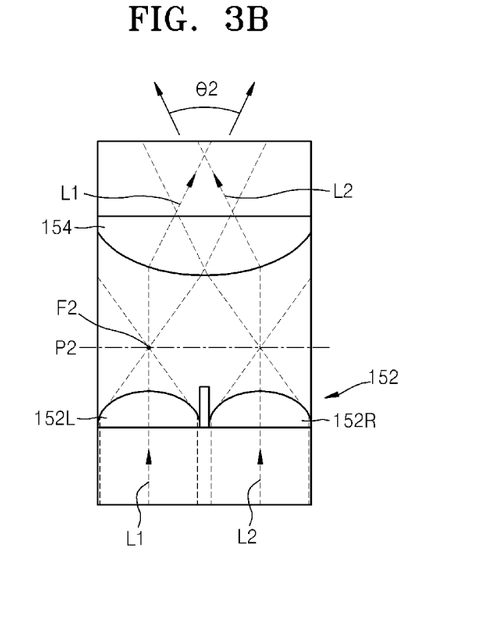
Figure 3C:
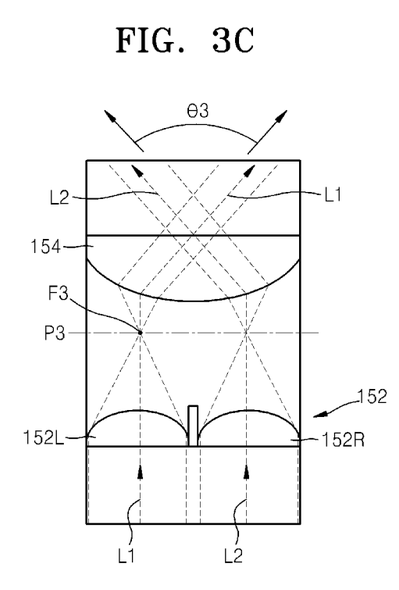

Respective curvatures of the first and second electrowetting lenses 152 and 154 can be controlled depending on voltage strengths of the first and second common voltages V1, V2, respectively. As illustrated in FIGS. 3A to 3C, focal points of the first electrowetting lenses 152 on the light exiting side, and of the second electrowetting lenses 154 on the light incident side, may be controlled to meet on the same focal planes P1, P2, and P3. Focal points F1, F2, and F3 of the first electrowetting lenses 152 on the light exiting side are points of focus in the case in which the beams L1 and L2 with the collimated light flux are incident on the first electrowetting lenses 152. Similarly, beams L1 and L2 starting at the focal points of the second electrowetting lenses 154 on the light incident side are refracted in the second electrowetting lenses 154 to be in the collimated light flux. Therefore, in an example in which focal points of the first electrowetting lenses 152 on the light exiting side and of the second electrowetting lenses 154 on the light incident side meet on the same focal planes P1, P2, and P3, beams L1 and L2 with the collimated light flux incident on the first electrowetting lenses 152 can exit in the collimated light flux from the second electrowetting lenses 154.

In addition, beams L1 and L2 having different starting points for light emitting on the focal planes P1, P2, and P3 of the second electrowetting lenses 154 on the light incident side may exit in different directions from the second electrowetting lenses 154. Therefore, if light L1 with the collimated light flux vertically incident on the first electrowetting lens 152L, that is a left lens of a pair of the first electrowetting lenses 152L and 152R that face one of the second electrowetting lenses 154, exits from the second electrowetting lens 154 and propagates in one direction, light L2 with the collimated light flux vertically incident on the first electrowetting lens 152R, that is a right lens of the pair of the first electrowetting lenses 152L and 152R, exits from the second electrowetting lens 154 and propagates in a direction different from the propagation direction of light L1.

Positions of the focal planes P1, P2, and P3 may also be controlled depending on the strength of the first and second common voltages V1 and V2. Since the positions of the focal planes P1, P2, and P3 are different from each other, the direction toward which the light L1 and L2 with the collimated light flux exits from the second electrowetting lens 154 varies according to the positions of the focal planes P1, P2, and P3. For example, the focal plane P2 illustrated in FIG. 3B is relatively farther from the second electrowetting lens 154 than the focal plane P1 illustrated in FIG. 3A is, and thus an angle θ2 between beams L1 and L2 with the collimated light flux exiting from the second electrowetting lenses 154 in FIG. 3B becomes narrower than an angle θ1 between beams L1 and L2 with the collimated light flux exiting from the second electrowetting lenses 154 in FIG. 3A. Furthermore, the focal plane P3 illustrated in FIG. 3C is relatively nearer to the second electrowetting lens 154 than the focal plane P1 illustrated in FIG. 3A is, and thus an angle θ3 between beams L1 and L2 with the collimated light flux exiting from the second electrowetting lenses 154 in FIG. 3C becomes larger than the angle θ1 between beams L1 and L2 with the collimated light flux exiting from the second electrowetting lenses 154 in FIG. 3A. Thus, the controller 190 may control the amount of separation between two beams L1 and L2 exiting from the electrowetting lens unit 150 by properly controlling the positions of the focal planes P1, P2, and P3 so that the two beams L1 and L2 can be directed toward a first viewing zone for a left eye $E_L$ of a viewer, and a second viewing zone for a right eye $E_R$ of the viewer, respectively.

As described above, the image panel 130 can render columns of pixels as images for the left eye and for the right eye simultaneously. In more detail, columns of pixels in the image panel 130 that correspond to the left first electrowetting lenses 152L of the pairs 152L and 152R of the first electrowetting lenses can represent images for the left eye, while columns of pixels of the image panel 130 that correspond to the right first electrowetting lenses 152R of the pairs 152L and 152R of the first electrowetting lenses can represent images for the right eye. The images for the left and right eyes refer to images having binocular disparity for the same object. In an example in which light L1 with the collimated light flux that is incident vertically on the left first electrowetting lenses 152L of the first electrowetting lenses is, in turn, incident on the left eye of a viewer via the second electrowetting lenses 154, the viewer can recognize images for the left eye through his/her left eye $E_L$. Likewise, in an example in which light L1 with the collimated light flux that is incident vertically on the right first electrowetting lenses 152R of the first electrowetting lenses is, in turn, incident on the right eye of the viewer via the second electrowetting lenses 154, the viewer can recognize images for the right eye through his/her right eye $E_R$. Accordingly, the viewer can view the images with binocular disparity with his/her eyes $E_L$ and $E_R$, and thus recognize them as autostereoscopic images without the aid of specially constructed 3D glasses.

The electrowetting lens unit 150 of the 3D image display apparatus 100 of the example embodiment of FIG. 1 performs separation of viewing zones into the first and second viewing zones R1 and R2, resulting in no beam loss in the process of separating viewing zones. Thus, the 3D image display apparatus 100 of the present embodiment has better brightness over conventional 3D image display apparatuses using barrier methods.

The example embodiment of FIG. 1 illustrates a case in which the first electrowetting lenses 152 are driven by the first common electrodes 157, but various other embodiments are not limited to such a configuration and/or process. The first common electrodes 157 arranged on left and right sides of the first electrowetting lenses 152 may be implemented to be driven independently from each other, wherein the first electrowetting lenses 152 may make lens surfaces asymmetric on left and right sides, thus controlling directions of beams L1 and L2 separated by the electrowetting lens unit 150 more freely. Similarly, the second electrodes 158 arranged on left and right sides of the second electrowetting lenses 154 can also be implemented to be driven independently from each other.

Figure 8:
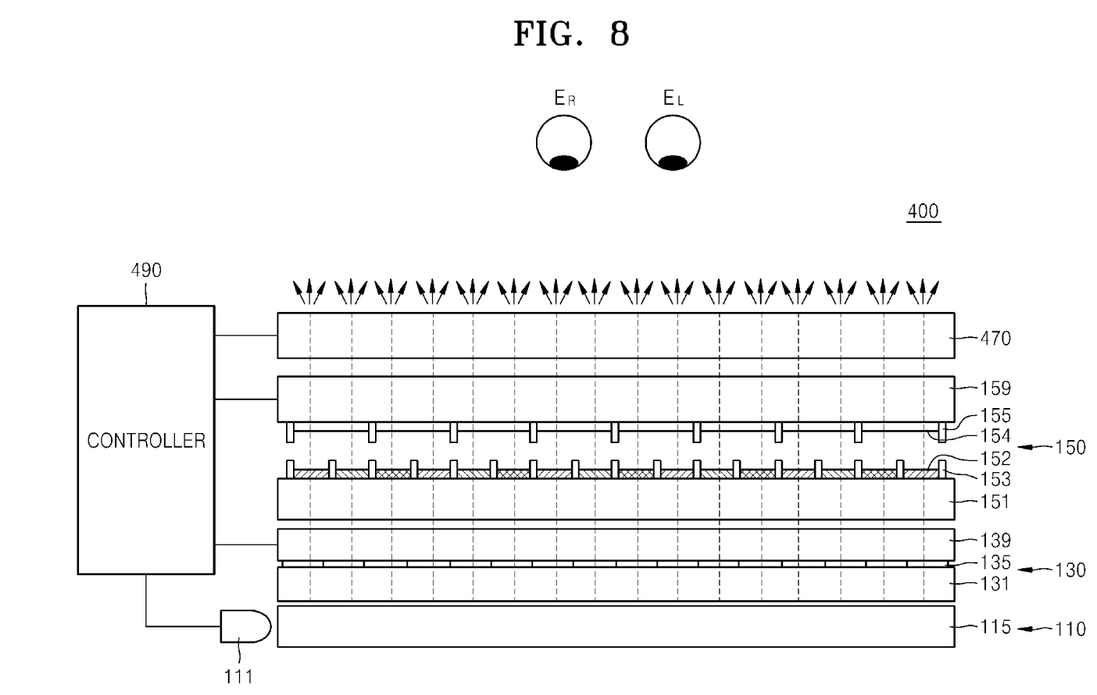
FIG. 8 illustrates a display of two dimensional (2D) images by the 3D image display apparatus of FIG. 7.

Although the 3D image display apparatus 100 of the present example illustrates a case of displaying autostereoscopic images, the apparatus 100 may also serve as a combined 2D and 3D image display apparatus in which 2D images can also be optionally displayed. If no voltage is applied to the electrowetting lens unit 150, then no electrowetting phenomenon occurs in the electrowetting lens unit 150, so the first and second electrowetting lenses 152 and 154 may not stay in a curved lens form but may remain in a flat form (as illustrated in FIG. 8, to be described in more detail later). In other words, if no voltage is applied to the electrowetting lens unit 150, the first and second electrowetting lenses 152 and 154 may have substantially zero curvature, and thus may have infinite foci. In this case, the electrowetting lens unit 150 emits incident beams L1 and L2 intact without separating viewing zones of the beams. In such an example in which the electrowetting lens unit 150 does not perform an operation of separating viewing zones, if all the pixels in the image panel 130 represent images for a single viewpoint, the 3D image display apparatus 100 may substantially display 2D images. Such a 2D image display mode may be easily achieved by an electrical control without any separate mechanical switching from the 3D image display mode.

The 3D image display apparatus 100 of the present example illustrates a case in which a second electrowetting lens 154 faces a pair of the first electrowetting lenses 152, but the display apparatus is not limited to such a configuration. There may be three or more of the first electrowetting lenses 152 facing one of the second electrowetting lenses 154, in which case the electrowetting lens unit 150 could perform separation of viewing zones into three or more viewing zones.

Figure 4:
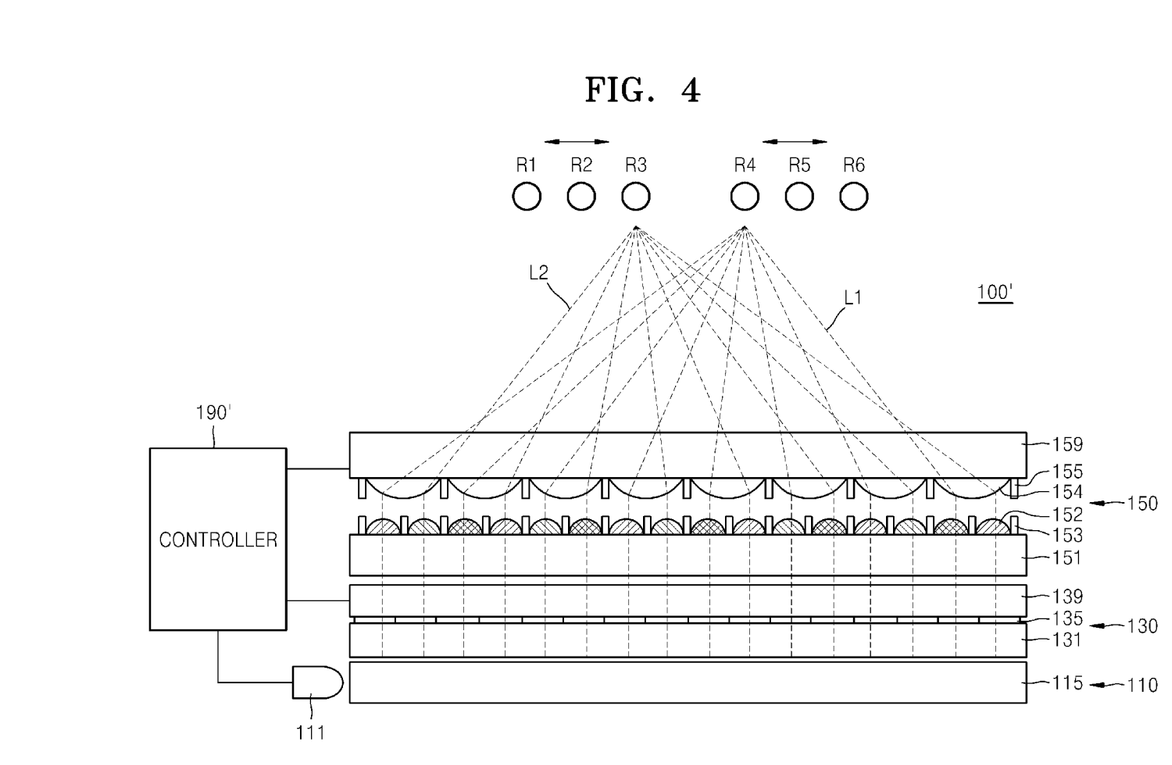
FIG. 4 illustrates a modified example of the 3D image display apparatus of FIG. 1.

FIG. 4 illustrates a modified example 100' of the 3D image display apparatus 100 of FIG. 1. Referring to FIG. 4, the modified 3D image display apparatus 100' is a multi-view display apparatus that provides a plurality of viewing zones R1, R2, R3, R4, R5, and R6, in which the backlight unit 110, the image panel 130, and the electrowetting lens unit 150 are substantially the same as those of the foregoing 3D image display apparatus 100, but a controller 190' may perform a different control process.

By controlling positions of the focal planes of the electrowetting lens unit 150 as described above, directions of the beams L1 and L2 to be separated by the electrowetting lens unit 150 can be controlled. Therefore, the controller 190' may time-sequentially control the electrowetting lens unit 150 so that the beams L1 and L2 whose directions are to be separated by the electrowetting lens unit 150 can be directed toward multiple viewing zones R1, R2, R3, R4, R5, and R6 in a time-sequential fashion. For example, by time-sequentially controlling the electrowetting lens unit 150, beams L1 that have passed through left first electrowetting lenses 152L can be directed toward viewing zones R4, R5, and R6 time-sequentially, while beams L2 that have passed through right first electrowetting lenses 152R can be directed toward viewing zones R3, R2, and R1 time-sequentially. In this case, the beams L1 and L2 that have passed through the electrowetting lens unit 150 may move through the viewing zones in the order of, for example, (R3, R4), (R2, R5), and (R1, R6). Alternatively, by time-sequentially controlling the electrowetting lens unit 150, the beams L1 that have passed through the left first electrowetting lenses 152L may be directed toward R4, R5, and R6, time-sequentially, while the beams L2 that have passed through the right first electrowetting lenses 152R may be directed toward R1, R2, and R3 time-sequentially. In this case, the beams L1 and L2 that have passed through the electrowetting lens unit 150 may move through the viewing zones in the order of (R1, R4), (R2, R5), and (R3, R6).

Meanwhile, the controller 190' may control the image panel 130 to be synchronized with time-sequential driving of the electrowetting lens unit 150 so as to display the multi-view images time-sequentially. The multi-view images refer to images as viewed from two or more viewpoints. The order of the multi-view images to be displayed in the image panel 130 can be determined to correspond to the order of the viewing zones R1, R2, R3, R4, R5, and R6 to be separated by the electrowetting lens unit 150. For example, if the electrowetting lens unit 150 performs separation of viewing zones in the order of (R3, R4), (R2, R5), and (R1, R6), the image panel 130 may time-sequentially render two-view images that correspond to the viewing zones (R3, R4), (R2, R5), and (R1, R6) to realize multi-view images. The two-view images corresponding to viewing zones that are apart from each other by a distance equal to the distance between both eyes may be images with binocular disparity. For example, if the distance between the viewing zones R3 and R4 is equal to the distance between the left eye $E_L$ and the right eye $E_R$ of a viewer, that is, the binocular distance, two multi-view images corresponding to the viewing zones R3 and R4 may be images with binocular disparity.

As such, the image panel 130 and the electrowetting lens unit 150 may work together to time-sequentially render multi-view images into each of the multiple viewing zones R1, R2, R3, R4, R5, and R6. Accordingly, if a viewer is situated within the viewing zones R1, R2, R3, R4, R5, and R6, he/she can recognize 3D images by viewing images with binocular disparity through his/her left and right eyes $E_L$ and $E_R$.

In various example embodiments, two or more viewing zones R1, R2, R3, R4, R5, and R6 separated by the electrowetting lens unit 150 may be apart from each other by a binocular distance in the modified example. However, in other various example embodiments, the distance in between the two or more viewing zones R1, R2, R3, R4, R5, and R6 may be narrower than the binocular distance. Furthermore, super multi-views can be realized in cases in which the distance in between the two or more viewing zones R1, R2, R3, R4, R5, and R6 is narrower than the diameter of the viewer's pupil.

Figure 5:
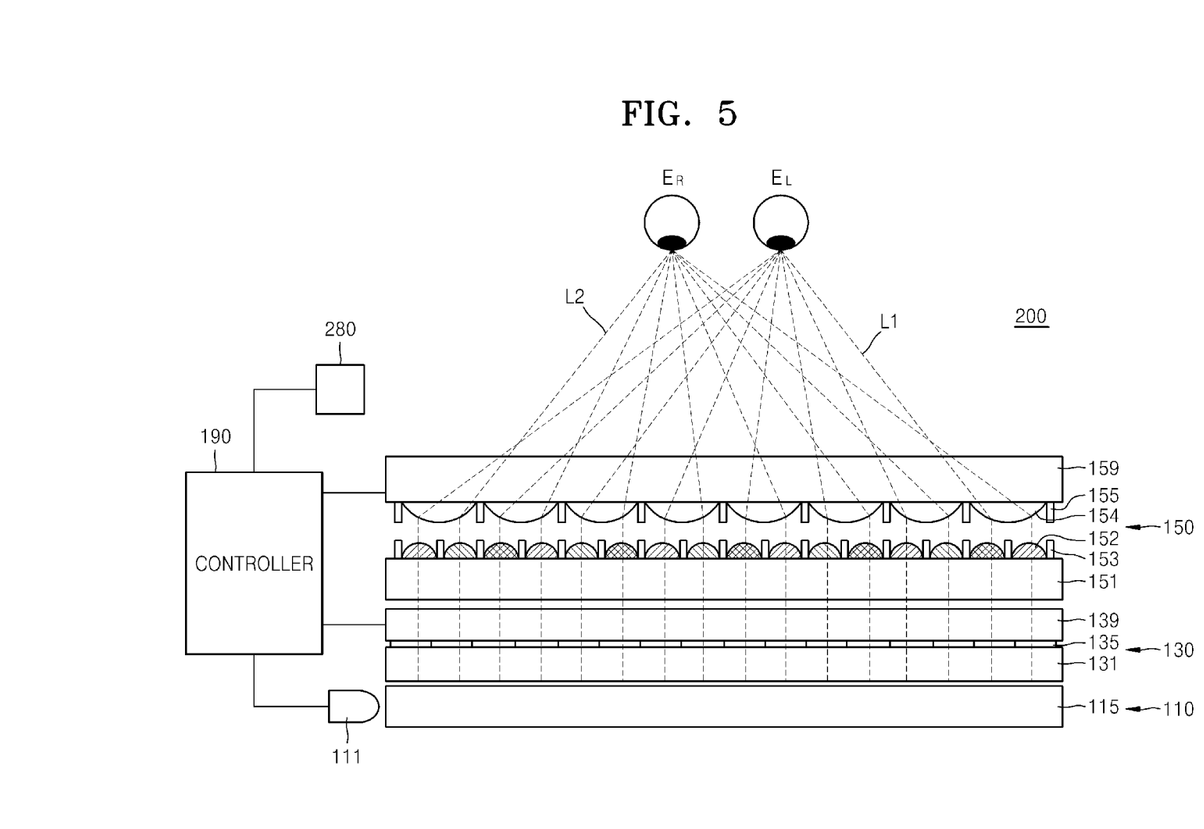
FIG. 5 is a schematic diagram illustrating a 3D image display apparatus according to another embodiment.

FIG. 5 is a schematic diagram illustrating a 3D image display apparatus 200 according to another example embodiment. Referring to FIG. 5, the 3D image display apparatus 200 of this example embodiment further includes a sensor 280 to detect a viewer's position, in addition to the components of the 3D image display apparatus 100 described with reference to FIG. 1. The sensor 280 may detect the viewer's position, especially the positions of the left and right eyes $E_L$ and $E_R$ of the viewer, and deliver information of the viewer's position to the controller 190. The controller 190 may control the electrowetting lens unit 150 based on the information of the viewer's position delivered from the sensor 280, so that beams L1 and L2 can be directed toward the left and right eyes $E_L$ and $E_R$ of the viewer. With this sensor 280, the 3D image display apparatus 200 can actively respond to the viewer's position to display autostereoscopic images.

Furthermore, the sensor 280 may detect the viewer's position in real time, and thus the controller 190 may control the electrowetting lens unit 150 in real time to respond to a change in the viewer's position. Thus, if the viewer moves during the display of images, the electrowetting lens unit 150 may be actively controlled to process the beams L1 and L2 according to the movement as the movement is happening.

Figure 6:
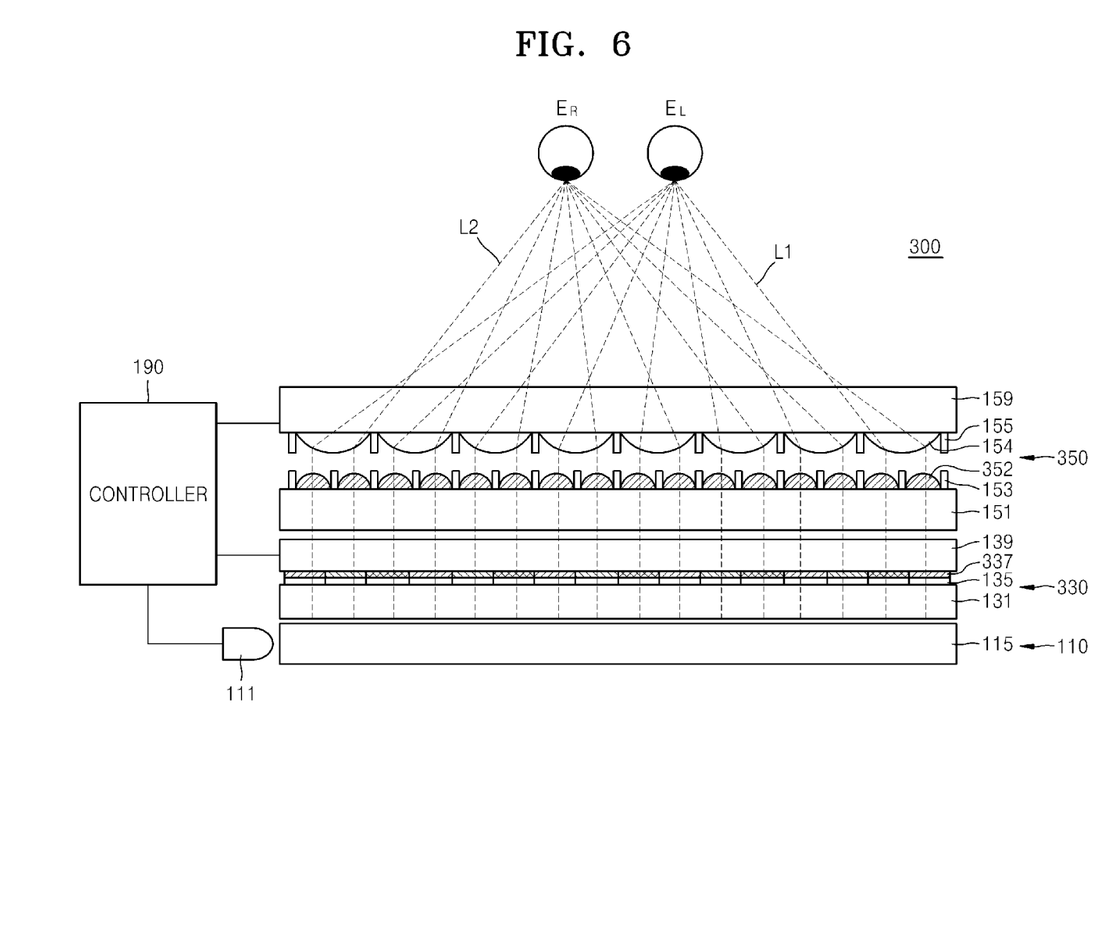
FIG. 6 is a schematic diagram illustrating a 3D image display apparatus according to yet another embodiment.

FIG. 6 is a schematic diagram illustrating a 3D image display apparatus 300 according to yet another example embodiment. Referring to FIG. 6, the first electrowetting lenses 352 of the electrowetting lens unit 350 are made from a colorless transparent medium, and an image panel 330 is established with a separate color filter 337 instead. Thus, the image panel 330 can employ a conventional color image panel as is. Therefore, the 3D image display apparatus 300 is substantially the same as the 3D image display apparatus 100 described with reference to FIG. 1, except that the 3D image display apparatus 300 employs a color filter 337 instead of a colored medium for the first electrowetting lenses 352.

Figure 7:
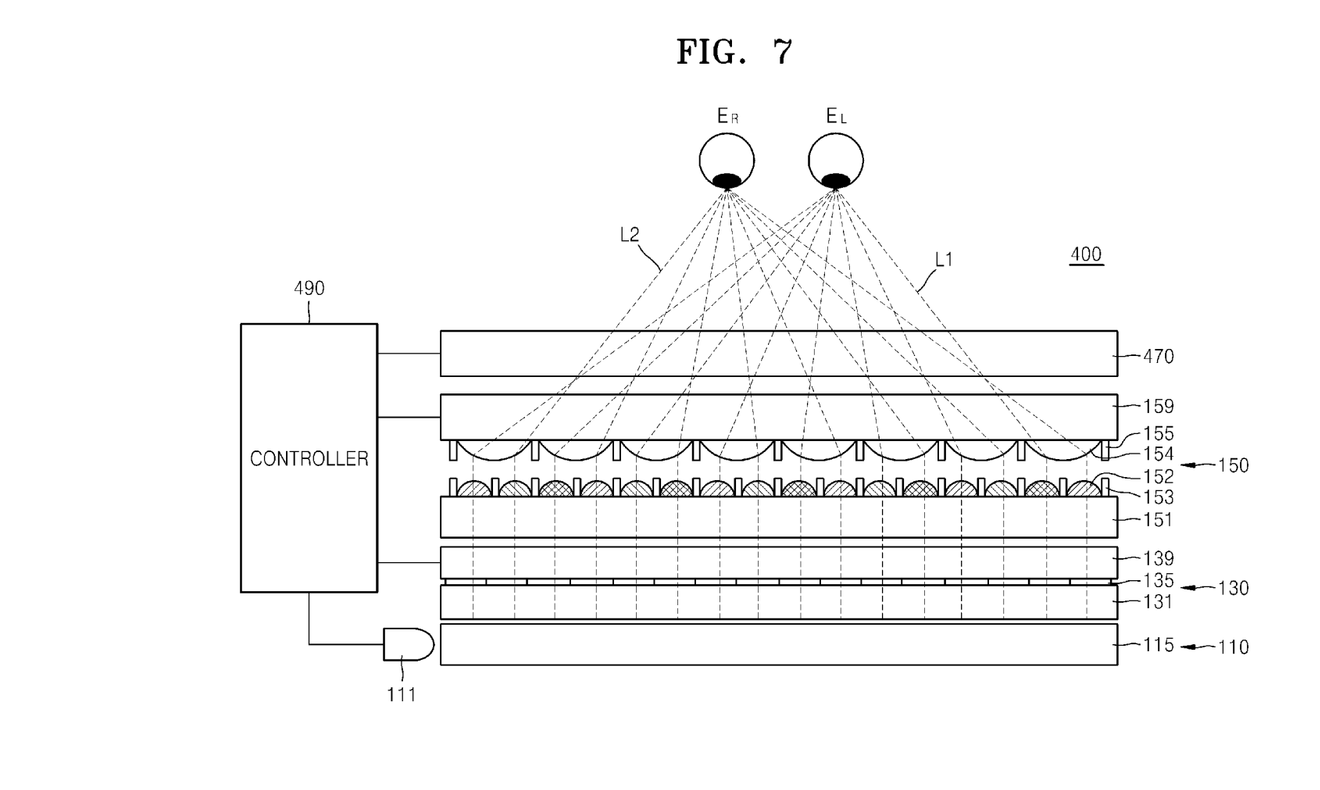
FIG. 7 is a schematic diagram illustrating a 3D image display apparatus according to still another embodiment.

FIG. 7 is a schematic diagram illustrating a 3D image display apparatus 400 according to still another example embodiment, and FIG. 8 illustrates the 3D image display apparatus 400 of FIG. 7 displaying 2D images.

Referring to FIG. 7, the 3D image display apparatus 400 of this example embodiment further includes a variable diffuser unit 470 in addition to the components of the 3D image display apparatus 100 of FIG. 1.

The variable diffuser unit 470 may be, for example, a commonly known polymer dispersed liquid crystal (PDLC) panel. The PDLC panel has a structure in which the PDLC layer, formed by mixing a black dye with the PDLC, is interposed between transparent substrates. The PDLC layer reaches a scattering state, in response to no electric field being applied, in which incident beams are scattered due to the difference in permittivity between the polymer and the liquid crystal, while it reaches a transparency state in response to an electric field being applied, in which it can transmit light due to the decrease in the difference in permittivity between the polymer and the liquid crystal according to the applied electric field.

The 3D image display apparatus 400 of this example embodiment is an apparatus capable of optionally displaying 2D and 3D images.

In a 3D image display mode, the controller 490 controls the variable diffuser unit 470 to be in the transparency state in which incident beams are not scattered. In this case, the beams L1 and L2, which are separated according to viewing zones by the electrowetting lens unit 150, can pass through the variable diffuser unit 470 without scattering, so the operations of the 3D image display apparatus 400 are substantially similar to those of the 3D image display apparatus 100 described with reference to FIG. 1. Therefore, in the 3D image display mode, viewing zones can be separated by the electrowetting lens unit 150 at a narrow viewing angle. In addition, in a case in which the 3D image display apparatus 400 further includes a sensor, such as the sensor 280 of FIG. 5, it can actively control an optical path to the viewer's position.

In displaying 2D images, referring to FIG. 8, the controller 490 may control the image panel 130 to render images for a single viewpoint with the entire amount of pixels in the image display 130. The controller 490 may also control the electrowetting lens unit 150 to maintain the curvature of the first and second electrowetting lenses 152 and 154 at substantially zero. As described above with reference to FIGS. 1 and 2, if no voltage is applied to the electrowetting lens unit 150, no electrowetting occurs, resulting in the first and second electrowetting lenses 152 and 154 having a substantially flat shape. Therefore, in the state in which the first and second electrowetting lenses 152 and 154 have this substantially flat shape, the electrowetting lens unit 150 does not perform separation of viewing zones during the display of 2D images. Furthermore, the controller 490 may control the variable diffuser unit 470 to be in the scattering state in which the variable diffuser unit 470 scatters incident light. As described above, since the backlight unit 110 emits beams with the collimated light flux, the beams exiting from the image panel 130 and the electrowetting lens unit 150 may have a high directivity. The variable diffuser unit 470 scatters high directive beams with such high directivity so that a wide field of view can be secured in displaying 2D images. As such, by employing the separate variable diffuser unit 470, the image panel 130 can secure the wide field of view even with, for example, a relatively inexpensive twisted nematic (TN) liquid crystal panel. In addition, the image panel 130 may only display images for one viewpoint using all of the entire amount of pixels in the image panel 130 in the 2D image display mode, so it can make use of its full resolution.

According to the 3D image display apparatus of the various example embodiments such as those described herein, multiple viewing zones may be created, switching between 2D and 3D image displays may be easily accomplished, and optical requirements for displaying 3D images (e.g., a narrow viewing angle and adjustment of a light path to a user's position) and optical requirements for displaying 2D images (e.g., wide viewing angle and high resolution) can be readily achieved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A three dimensional (3D) image display apparatus comprising:
   a backlight unit which emits light;
   an image panel which comprises a plurality of pixels for modulating the light from the backlight unit according to image information to form a gray scaled image;
   an electrowetting lens unit which comprises a plurality of first electrowetting lenses arranged to correspond to the plurality of pixels in the image panel and a plurality of second electrowetting lenses arranged opposite to the first electrowetting lenses, wherein at least two of the first electrowetting lenses face each one of the second electrowetting lenses; and
   a controller which controls the electrowetting lens unit to separate beams exiting from the image panel into at least two viewing zones in a 3D image display mode.

2. The 3D image display apparatus of claim 1, wherein the controller controls the electrowetting lens unit in the 3D image display mode such that focal points of the plurality of the first electrowetting lenses on light exiting sides and of the plurality of the second electrowetting lenses on light incident sides share a same focal plane.

3. The 3D image display apparatus of claim 1, wherein the at least two of the first electrowetting lenses is a pair of the first electrowetting lenses arranged adjacent to each other in a horizontal direction.

4. The 3D image display apparatus of claim 3, wherein the controller controls the electrowetting lens unit in the 3D image display mode such that beams that have passed through one electrowetting lens of each pair of the first electrowetting lenses may be directed to a first viewing zone, while beams that have passed through another electrowetting lens of each pair of the first electrowetting lenses may be directed to a second viewing zone that is different from the first viewing zone,
   wherein the image panel renders images for a single viewpoint that correspond to the first viewing zone with pixels that each correspond to the one electrowetting lens of each pair of the first electrowetting lenses, and renders images for a single viewpoint that correspond to the second viewing zone with pixels that each correspond to the other first electrowetting lens of each pair of the first electrowetting lenses.

5. The 3D image display apparatus of claim 3, wherein the controller controls the electrowetting lens unit in the 3D image display mode such that beams that have passed through one electrowetting lens of each pair of the first electrowetting lenses are time-sequentially directed to a plurality of the first viewing zones, while beams that have passed through another electrowetting lens of each pair of the first electrowetting lenses are time-sequentially directed to a plurality of the second viewing zones, the plurality of the first viewing zones and the plurality of the second viewing zones being different from each other,
   wherein the image panel time-sequentially renders multi-view images with two images at a time.

6. The 3D image display apparatus of claim 1, wherein the controller controls the electrowetting lens unit in a two dimensional (2D) image display mode such that beams may exit from the image panel without separation of viewing zones.

7. The 3D image display apparatus of claim 6, wherein the controller controls the electrowetting lens unit in the 2D image display mode such that the plurality of the first electrowetting lenses and the plurality of the second electrowetting lenses have substantially infinite foci.

8. The 3D image display apparatus of claim 6, wherein the controller controls the electrowetting lens unit in the 3D image display mode or the 2D image display mode selectively.

9. The 3D image display apparatus of claim 1,
wherein the plurality of the first electrowetting lenses include a first plate, first sidewalls in a square lattice form provided on the first plate, first mediums provided in spaces between the first sidewalls, and a first electrode structure provided on the first sidewalls,
wherein the plurality of the second electrowetting lenses include a second plate arranged apart from the first plate, second sidewalls in a square lattice form provided on the second plate, second mediums provided in spaces between the second sidewalls, and a second electrode structure provided on the second sidewalls, and
wherein a transparent base medium not mixable with the first and/or second mediums is filled in a space between the first and second electrowetting lenses.

10. The 3D image display apparatus of claim 9, wherein the first electrode structure comprises first electrodes arranged on both opposite sides of the first sidewalls in a horizontal direction of the first sidewalls, and the second electrode structure comprises second electrodes arranged on both opposite sides of the second sidewalls in a horizontal direction of the second sidewalls.

11. The 3D image display apparatus of claim 10, wherein a first common voltage is applied to the first electrodes, and a second common voltage is applied to the second electrodes.

12. The 3D image display apparatus of claim 9, wherein the first medium is an oil based solution including color dyes, or a water solution including color pigments.

13. The 3D image display apparatus of claim 1, wherein the plurality of the first electrowetting lenses comprises red, green, and blue electrowetting lenses, and the image panel comprises no color filter.

14. The 3D image display apparatus of claim 1, wherein the plurality of the first electrowetting lenses are transparent electrowetting lenses, and the image panel further comprises a color filter.

15. The 3D image display apparatus of claim 1, wherein the backlight unit is a light source emitting collimated light.

16. The 3D image display apparatus of claim 1, wherein the sidewalls are made from black materials that block light transmission.

17. The 3D image display apparatus of claim 1, wherein the image panel is a liquid crystal panel.

18. The 3D image display apparatus of claim 1, further comprising a sensor to detect a viewer's position,
wherein the controller controls separation of viewing zones of the electrowetting lens unit based on information regarding the viewer's position detected from the sensor in the 3D image display mode.

19. The 3D image display apparatus of claim 1, further comprising a variable diffuser unit capable of switching between a scattering state to scatter beams through the variable diffuser unit and a transparency state to transmit beams through the variable diffuser unit without scattering,
wherein the controller controls the variable diffuser unit to be in the transparency state in the 3D image display mode and to be in the scattering state in the 2D image display mode.

20. The 3D image display apparatus of claim 19, wherein the variable diffuser unit is a polymer dispersed liquid crystal panel.

21. A three dimensional (3D) image display apparatus comprising:
an electrowetting lens unit including a plurality of first electrowetting lenses arranged to correspond to a plurality of pixels, and a plurality of second electrowetting lenses arranged opposite to the first electrowetting lenses, wherein at least two of the first electrowetting lenses face each one of the second electrowetting lenses; and
a controller which controls the electrowetting lens unit to separate beams passing the electrowetting lens unit into at least two viewing zones in a 3D image display mode.

22. The 3D image display apparatus of claim 21, wherein the controller adjusts the curvature of the first and second electrowetting lenses through voltages applied to electrodes provided adjacent to the respective first and second electrowetting lenses.

23. The 3D image display apparatus of claim 22, wherein the controller controls the first and second electrowetting lenses to be substantially flat to display two dimensional images.

24. The 3D image display apparatus of claim 22, wherein the controller actively adjusts the curvature of the first and second electrowetting lenses according to a sensed movement of a viewer.

25. The 3D image display apparatus of claim 21, wherein the controller sequentially controls the electrowetting lens unit to separate beams passing the electrowetting lens unit into at least two viewing zones for each eye of a viewer.

26. A method of displaying three dimensional (3D) images, the method comprising:
controlling a plurality of first electrowetting lenses arranged to correspond to a plurality of pixels, and a plurality of second electrowetting lenses arranged opposite to the first electrowetting lenses, wherein at least two of the first electrowetting lenses face each one of the second electrowetting lenses, to separate beams passing the electrowetting lens unit into at least two viewing zones in a 3D image display mode.

27. The method of claim 26, further comprising adjusting the curvature of the first and second electrowetting lenses through voltages applied to electrodes provided adjacent to the respective first and second electrowetting lenses.

28. The method of claim 27, further comprising controlling the first and second electrowetting lenses to be substantially flat to display two dimensional images.

29. The method of claim 27, further comprising controlling the curvature of the first and second electrowetting lenses according to a sensed movement of a viewer.

30. The method of claim 26, further comprising sequentially controlling the electrowetting lens unit to separate beams passing the electrowetting lens unit into at least two viewing zones for each eye of a viewer.

* * * * *